E. Allen,

Making Cartridge Cases,

No. 1,949, Reissued May 9, 1865.

Y

Z.

Witnesses;
Geo. H. Fairfield,
Jos. G. Arnold

Inventor;
Ethan Allen

UNITED STATES PATENT OFFICE.

ETHAN ALLEN, OF WORCESTER, MASSACHUSETTS.

MACHINE FOR MAKING CARTRIDGE-CASES.

Specification forming part of Letters Patent No. 27,094, dated February 14, 1860; Reissue No. 1,949, dated May 9, 1865.

DIVISION No. 2.

*To all whom it may concern:*

Be it known that I, ETHAN ALLEN, of the city and county of Worcester, State of Massachusetts, have invented certain new and useful Improvements in Machinery for Making Loaded Caps or Cap-Cartridges; and I hereby declare the following to be a full, clear, and exact description of the construction and operation of the same, reference being had to the accompanying drawings, in which—

Figure 1:
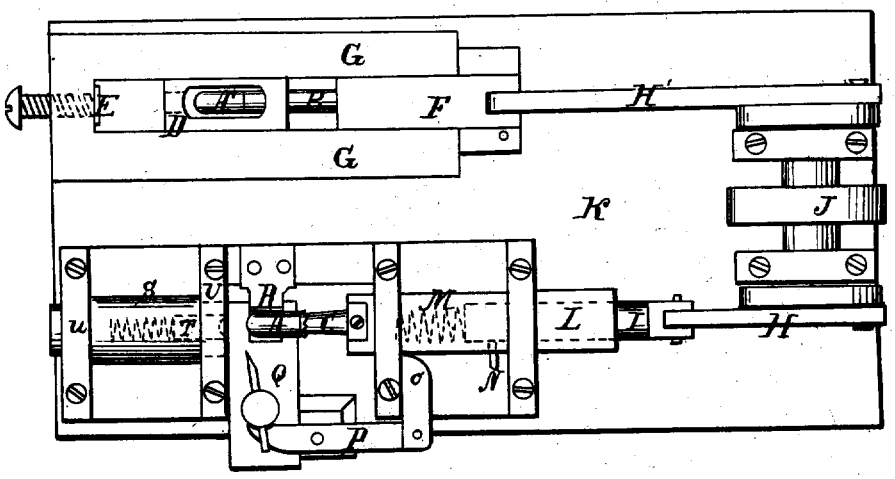
Figure 2:
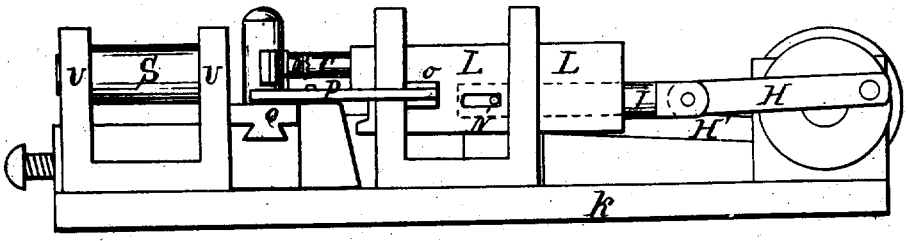
Figure 2:
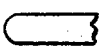
Figure 2:
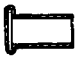

Figure 1 is a top view or plan, and Fig. 2 a side view, the same letters indicating the same parts in both.

My improvements relate to the construction or formation of the case of a metallic cartridge, and consist in an arrangement of mechanism to trim or cut off the open end of the case or shell to make them of the required length. It then goes through another operation, which is the subject of another reissue of these Letters Patent.

The construction of my improvements, as shown in the drawings, is as follows:

J is the driving-pulley, turning in suitable bearings in the base K, on which is a crank or eccentric, and is connected to the shaft H.

L is a slide, which carries a punch or mandrel, C, at one end, so arranged as to turn freely in L, and fits the tube of the case A, L receiving its motion from the slide I, placed in it, with a spring, M, at its inner end, and pin N at one side, and so arranged that after moving L a certain distance L may be stropped and the slide I, compressing the spring M, continue its motion the remainder of the length of the crank on J.

S is a hollow mandrel receiving motion and giving it to an internal chuck, T, backed up by a spring, its center being on a line with the center of the mandrel C, (or it may be open its entire length through mandrel S, so as to eject the shell A from the opposite end of the mandrel S.)

Q is a slide placed at right angles, or nearly so, to L, and carries a tool for cutting off the end of the case, similar to ordinary turning-lathes, having a spring or weight to press the tool back from the work, the lever P being so hung and provided with the arm *o* that when the slide I is moved clear forward its pin N presses against the sloping or cam surface of O, pressing it back, and by the other end of P moving the tool up to its work.

U U are bearings or boxes for the mandrel S.

R is a guide to facilitate placing the rough case on the mandrel, C and to remove the trimmed one when it is ejected from the front end of mandrel S.

Y is a case or shell as it comes from the press, after being drawn to the required size and before it is trimmed or cut the required length.

The operation of the machine is as follows: Motion being given to mandrel S and pulley J, the case A is placed so as to be taken by punch or mandrel C and carried into S, pressing back the chuck T, which by its pressure or the close fitting of the case A in the mandrel S gives a rotary motion to both A and C, and when the case or shell A is carried a sufficient distance into the mandrel S, the slide L stops, and the slide I, continuing, moves up the tool in Q, by P, through N, against O, and the point of the tool cuts or trims the case A the exact length, and the slide I, moving back the tool, and slide Q return to place, leaving the case to follow the slide or mandrel C out of S, when the same operation is repeated with the next shell or cartridge-case.

I claim—

1. The sliding mandrel, which advances and supports the shell, in combination with the revolving chuck, which grips and revolves the shell against the action of the cutting-tool, substantially as described.

2. The combination of the sliding and revolving mandrel C, the revolving chuck S, and the automatic tool Q, substantially as described.

3. Operating the cutting-tool by the supplemental motion of the mandrel, carrier, or slide L, as described.

ETHAN ALLEN.

Witnesses:

S. FOREHAND,

GEO. W. FAIRFIELD.